US006368651B1

(12) United States Patent
Gerlat et al.

(10) Patent No.: US 6,368,651 B1
(45) Date of Patent: Apr. 9, 2002

(54) USE OF ADDITIVES TO MODIFY THE TASTE CHARACTERISTICS OF N-NEOHEXYL-α-ASPARTYL-L-PHENYLALANINE METHYL ESTER

(75) Inventors: Paula A. Gerlat, Highland Park; Gale C. Walters, Vernon Hills; Ihab E. Bishay, Mundelein; Indra Prakash, Hoffman Estates; Tammy C. Jarrett, Palatine; Nitin Desai, Mt. Prospect; Harold A. Sawyer, Lake Zurich, all of IL (US); Claire-Lise T. Bechert, Paris (FR)

(73) Assignee: The NutraSweet Company, Chicago, IL (US)

( * ) Notice: Subject to any disclaimer, the term of this patent is extended or adjusted under 35 U.S.C. 154(b) by 0 days.

(21) Appl. No.: 09/568,436

(22) Filed: May 10, 2000

Related U.S. Application Data

(60) Provisional application No. 60/134,064, filed on May 13, 1999.

(51) Int. Cl.⁷ ............................................. A23L 1/236
(52) U.S. Cl. ........................ 426/548; 426/534; 560/40

(58) Field of Search ............................ 426/548, 534, 426/535, 536, 537, 538; 560/40, 41

(56) References Cited

U.S. PATENT DOCUMENTS 5,480,668 A * 1/1996 Nofre et al. ................. 426/548

OTHER PUBLICATIONS

Rombauer et al., Joy of Cooking, 1975, The Bobbs–Merrill Company, Inc., Indianapolis, pp. 556, 568, and 569.*

* cited by examiner

*Primary Examiner*—Leslie Wong
(74) *Attorney, Agent, or Firm*—Fitzpatrick, Cella, Harper & Scinto; Jeffrey M Hoster

(57) ABSTRACT

This invention relates to the use of at least one taste modifying ingredient to modify at least one taste characteristic imparted by N-[N-(3,3-dimethylbutyl)-L-α-aspartyl]-L-phenylalanine 1-methyl ester, or neotame, compositions containing the same, and use of modified forms of neotame that possess an improved taste, wherein at least one taste characteristic imparted by neotame is positively affect by the modification of neotame.

58 Claims, No Drawings

USE OF ADDITIVES TO MODIFY THE TASTE CHARACTERISTICS OF N-NEOHEXYL-α-ASPARTYL-L-PHENYLALANINE METHYL ESTER

This application claims benefit of U.S. Provisional Patent Application No. 60/134,064, filed May 13, 1999.

BACKGROUND OF THE INVENTION

1. Field of the Invention

This invention relates to the use of additives to positively affect at least one taste characteristic imparted by the high intensity sweetener, N-[N-(3,3-dimethyl butyl)-L-α-aspartyl]-L-phenylalanine 1-methyl ester, or neotame, and compositions containing the same.

2. Related Background Art

N-[N-(3,3-dimethylbutyl)-L-α-aspartyl]-L-phenylalanine 1-methyl ester is a highly intense non-nutritive sweetening agent useful to impart sweetness to a wide variety of food products. This sweetener, disclosed in U.S. Pat. No. 5,480,668, is approximately 8,000 times as sweet as sucrose, on a weight basis. Thus, very small quantities of this sweetening agent may be used to sweeten foods without adding calories.

Flavor modifiers may be added to foods, beverages or personal care products, pharmaceutical preparations, or other compositions to increase acceptance of products by enhancing desirable tastes and/or aromas or by masking or eliminating undesirable taste and/or aroma attributes. Flavor modifiers may be used to modify the taste and/or aroma profile and/or the temporal taste and/or aroma profile of one or more specific flavoring ingredients. The temporal profile of a taste relates to the manner in which taste development occurs, e.g., the onset of the taste, the intensity of the taste, the time it takes for the taste to reach maximum taste intensity, the time it takes for the taste to dissipate (linger). Taste modifiers may be used in any concentration necessary to achieve the desired taste profile of a product for a desired application. Taste modifiers may be used above, below or at threshold concentrations to supplement, enhance, or modify the original taste of a composition. The threshold taste concentration of an ingredient is that concentration at which the taste of that ingredient can be detected in a food composition, and typically, is different for different food compositions. At below threshold concentrations, or sub-threshold concentrations, the taste modifier does not impart a characteristic taste of its own, but provides a taste-modifying effect to one or more tastes in a composition.

High intensity sweeteners, such as neotame, often produce a sweet taste that has a different temporal profile than that of sugar. For example, the sweet taste produced by high intensity sweeteners may have a sweet taste that has a faster or a slower onset or a shorter or longer sweetness taste linger than the sweet taste produced by sugar or may change the taste balance of a food composition. Because of these differences, use of a high intensity sweetener to replace a bulk sweetener, such as sugar, in a food or beverage, may cause an unbalanced profile in the resulting food composition. It is well known to those skilled in the art of food/beverage formulations that changing the sweetener in a composition requires re-balancing of the flavor and taste profiles of the composition. A high intensity sweetener that has a taste profile which can be selectively modified to impart specific desired taste characteristics could significantly expand the type and variety of compositions that may be prepared with that sweetener. Accordingly, it would be desirable to develop a method to selectively modify the taste characteristics of a high intensity sweetener.

SUMMARY OF THE INVENTION

This invention relates to compositions containing N-[N-(3,3-dimethylbutyl)-L-α-aspartyl]-L-phenylalanine 1-methyl ester, or neotame, of the formula

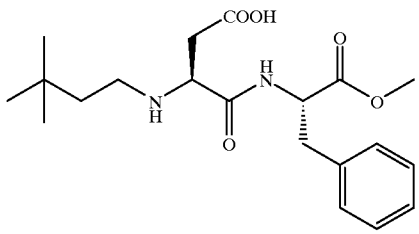

and at least one taste modifying ingredient that positively affects one or more of the taste characteristics imparted by neotame in at least one product use. Although neotame is a known high intensity sweetener, it has now been discovered that selected materials can function as taste modifiers to affect the overall taste characteristics of compositions containing neotame in sweetening effective concentrations.

This invention also relates to the use of modified forms of neotame to prepare compositions that possess an improved taste compared to compositions containing neotame. The improved taste results from the positive effect on at least one taste characteristic imparted by neotame by the modification of neotame. A modified form of neotame may be used alone, or in combination with neotame, another modified form of neotame or a taste modifying ingredient to provide compositions wherein one or more of the taste characteristics imparted by neotame are positively affected in at least one product use.

This invention also relates to the method of preparing compositions containing neotame, in sweetening effective amounts, and one or more taste modifying ingredients. According to the method of this invention, one or more taste modifying ingredients may be added to a neotame-containing composition to positively affect at least one characteristic taste imparted by neotame in that composition.

DETAILED DESCRIPTION OF THE INVENTION

This invention relates to the method of using taste modifying ingredients to positively affect at least one taste characteristic imparted by N-[N-(3,3-dimethylbutyl)-L-α-aspartyl]-L-phenylalanine 1-methyl ester, or neotame. This invention also relates to compositions containing neotame and at least one taste modifying ingredient wherein at least one characteristic of the taste of neotame imparts to the composition is positively affected. The compositions of this invention include food compositions, pharmaceutical compositions as well as compositions used in the preparation of food and/or pharmaceutical compositions. The compositions of this invention may be prepared in any form, including solids, semi-solids, gels and liquids, for example, beverages, dairy products, frozen dairy products, baked goods, cereals, gelatins, nutraceuticals and the like. Most preferably, this invention relates to the use of taste modifying ingredients to positively affect at least one taste characteristic imparted by neotame in foods, and particularly in beverages.

Neotame, disclosed in U.S. Pat. No. 5,480,668, is approximately 8,000 times as sweet as sucrose, on a weight basis. Thus, very small quantities of this sweetening agent may be used to produce foods that are equi-sweet tasting to presently available high caloric food products. According to one embodiment of this invention, compositions containing neotame, at sweetening effective concentrations, and at least one taste modifying ingredient, at below taste threshold concentrations, possess an improved taste compared to compositions containing neotame, without an added taste modifying ingredient. Specifically, the improved taste results from the positive effect of the taste modifying ingredient(s) on at least one taste characteristic imparted by neotame in the composition. A taste characteristic imparted by neotame, as defined herein, is any attribute of the taste provided or enhanced by neotame at or above sweetening threshold concentrations. Such taste characteristics include, for example, the sweetness taste attribute inherent to neotame, its compatibility with other tastes or flavors in a composition, including for example, neotame's effect on the balance of the tastes or flavors of a composition, as well as temporal taste attributes, such as sweetness onset, sweetness intensity and sweetness linger.

The neotame used in this invention may take any form. For example, it may be a salt or complex such as described in U.S. Pat. No. 6,291,004, U.S. Pat. No. 6,180,156, U.S. Pat. No. 6,129,942, U.S. Pat. No. 6,146,680, U.S. Pat. No. 6,214,402, and U.S. Provisional Patent Application No. 60/126,363, the disclosure of each of which is incorporated by reference herein. Other exemplary forms of neotame that may be used in this invention include co-crystallized forms and cyclodextrin complexes, such as described in U.S. Pat. No. 6,214,402 and U.S. Provisional Patent Application No. 60/100,867, the disclosures of each of which are incorporated by reference herein. Agglomerates and various forms of neotame crystallized using different processes may also be used.

According to the process of this invention, one or more taste modifying ingredients may be added to a composition containing neotame to modify and improve the taste profile of that composition, as desired. A broad range of ingredients, as well as flavor ingredients and other sweeteners may be combined with neotame, to provide compositions having an enhanced taste. Moreover, the range of materials that can modify at least one characteristic of the taste imparted by neotame to a composition is not limited to any specific chemical classification. The taste modifying ingredients described herein are ingestibly acceptable, non-toxic or otherwise non-deleterious, conventional materials that may be used in foods and that have a level of purity to permit such use.

It is understood that the amount of the taste modifying ingredient(s) that may be added to a particular neotame-sweetened composition may vary depending on the degree of taste modification desired, the effectiveness of the taste modifying ingredient(s) to modify the taste characteristics imparted by neotame, the taste threshold concentration of the ingredient(s), other flavors or ingredients in the composition, as well as the characteristics of the composition. It is understood that not all of the taste modifying ingredients described herein will affect at least one characteristic of the taste of neotame in all product uses or at all concentrations. For example, taste modifying ingredients that are useful for affecting at least one characteristic of the taste of neotame in a coffee beverage or in a cola beverage having a selected ingredient formula may or may not be useful for affecting at least one characteristic of the taste of neotame in a fruit-flavored soft drink beverage or in a cola beverage having a different ingredient formula. Taste modifying ingredients that are useful for affecting at least one characteristic of the taste of neotame in a formulation using one co-ingredient (e.g., a tabletop preparation using a selected bulking agent) may or may not be useful for affecting at least one characteristic of the taste of neotame in a similar formulation using a different co-ingredient (e.g., a different bulking agent). However, the taste modifying ingredients according to this invention will positively affect one or more of the taste characteristics imparted by neotame in at least one product use. Based upon the teachings provided herein, it is considered to be within the ordinary skill of one in the art to select and evaluate taste modifying ingredients to determine which taste modifying ingredients may be suitable for use in a product and to determine suitable use concentrations of the taste modifying ingredients for such product.

Addition of salt ingredients to neotame-sweetened compositions has been shown to effectively modify at least one of the taste characteristics imparted by neotame. Advantageously, a taste modifying salt ingredient may be added to a neotame-containing composition, alone, or in combination with one or more of the other herein-described neotame taste modifying ingredients. Salt ingredients that are useful taste modifying ingredients according to this invention include inorganic salts, particularly the sodium, potassium and calcium salts of inorganic acids. Exemplary neotame taste modifying salt ingredients include sodium chloride, sodium sulphate, potassium phosphate, calcium phosphate, sodium tripolyphosphate, sodium bicarbonate, sodium carbonate, potassium carbonate, calcium carbonate, potassium hydrogen carbonate, calcium chloride-dihydrate, and the like. Sodium chloride is a particularly useful neotame taste modifying ingredient according to this invention. According to this invention, a taste modifying salt ingredient may be incorporated into a neotame-containing composition in an amount that is sufficient to positively affect at least one of the taste characteristics imparted by neotame, but that is also less than the taste threshold amount of the salt ingredient. In a test cola-beverage formulation, the following salt ingredients or ingredient combinations were found to be ineffective as a taste modifying ingredient according to this invention: potassium chloride and a combination of potassium chloride, calcium chloride and sodium chloride. These ingredients, however, may be useful taste modifying ingredients in different product uses, e.g., different formulations or different applications that may contain different flavoring ingredients.

Amino acid and nucleotide ingredients have also been shown to be effective taste modifying ingredients of neotame. The addition of one or more amino acid and/or nucleotide ingredients to a neotame-containing composition has been found to affect at least one of the taste characteristics imparted by neotame. Advantageously, a taste modifying amino acid or nucleotide ingredient may be added to a neotame-containing composition, alone, or in combination with one or more of the other herein-described neotame taste modifying ingredients. Exemplary amino acid or nucleotide ingredients useful as neotame taste modifying ingredients include aspartic acid, tyrosine, serine, threonine, cysteine, glycine, alanine, asparagine, proline, sodium inosine-5' phosphate, sodium guanosine-5' phosphate. L-Tyrosine and serine are particularly useful neotame taste modifying ingredients according to this invention. According to this invention, a taste modifying amino acid or nucleotide ingredient may be incorporated into a neotame-containing composition in an amount that is sufficient to positively affect at least one of the taste characteristics imparted by neotame, but that is also less than the taste threshold amount of the amino acid or nucleotide ingredient.

Carbohydrate ingredients have also been shown to be effective taste modifying ingredients. Addition of a carbohydrate ingredient to neotame-sweetened compositions has been shown to effectively modify at least one of the taste characteristics imparted by neotame. Advantageously, a taste modifying carbohydrate ingredient may be added to a neotame-containing composition, alone, or in combination with one or more of the other herein-described neotame taste modifying ingredients. Carbohydrates that are useful taste modifying ingredients according to this invention are low molecular weight polyhydroxy compounds. Preferably, useful polyhydroxy compounds may have molecular weights less than about 1000 g/mol, and more preferably, less than 500 g/mol. Exemplary carbohydrate ingredients useful as neotame taste modifying ingredients include sugars, such as mannitol, sucrose, fructose and sugar distillates, sugar alcohols, such as erythritol and maltitol, pyrones, such as maltol, flavones, such as naringin, and polyols, such as glycerol (glycerin), and the like. Glycerol and sucrose are particularly useful neotame taste modifying ingredients. According to this invention, a taste modifying carbohydrate ingredient may be incorporated into a neotame-containing composition in an amount that is sufficient to positively affect at least one of the taste characteristics imparted by neotame, but in an amount that is also less than the taste threshold amount of the carbohydrate ingredient in that composition. In a test cola-beverage formulation, xylitol, naringin and sorbitol were found to be ineffective taste modifying ingredients according to this invention. These ingredients, however, may be useful taste modifying ingredients in different product uses, e.g., different formulations or different applications that may contain different flavoring ingredients.

Other sweetening ingredients have also been shown to be effective sweetness taste modifying ingredients of neotame. According to this invention, a high intensity sweetening ingredient may be used as a taste modifying ingredient and may be incorporated with neotame into a composition in an amount that is sufficient to positively affect at least one of the taste characteristics imparted by neotame, but in an amount that is also less than the taste threshold amount of the high intensity sweetening ingredient in that composition. Advantageously, a high intensity sweetening taste modifying ingredient may be added to a neotame-containing composition, alone, or in combination with one or more of the other herein-described neotame taste modifying ingredients. Exemplary sweetening ingredients that are useful as neotame taste modifying ingredients include, for example, thaumatin, saccharin, acesulfame-K, aspartame, talin, neohesperidin dihydrochalcone, sucralose, cyclamate and glycyrrhizin and salts thereof, such as monoammonium glycyrrhizinate.

Acesulfame-K, neohesperidin dihydrochalcone, and aspartame are particularly useful neotame taste modifying ingredients.

Other flavoring ingredients have also been shown to be effective taste modifying ingredients. Addition of a flavoring ingredient at sub-threshold taste concentrations to neotame-sweetened compositions has been shown to effectively modify at least one of the taste characteristics imparted by neotame. Advantageously, a taste modifying flavoring ingredient may be added to a neotame-containing composition, alone, or in combination with one or more of the other herein-described neotame taste modifying ingredients. Exemplary flavoring ingredients that are useful as neotame taste modifying ingredients include mouthfeel enhancing and flavor enhancing ingredients, such as Jambu, Robertet mouthfeel enhancer, Virginia Dare Prosweet, Ohly Krit flavor enhancer, coffee flavoring or coffee flavor enhancing ingredients, such as Givaudan Roure Coffee Flavor, Bell Artificial Coffee Flavor, David Michael's coffee beverage flavor enhancer, vanillin, vanilla, honey flavoring ingredients, such as Givaudan Roure Natural Honey Flavor, molasses flavoring ingredients, such as Bush, Boake & Allen Molasses Flavor, citrus flavoring ingredients, coconut flavoring ingredients, such as Givaudan Roure Natural Coconut Flavor, ginger flavoring ingredients, such as ginger extract, bitter flavor ingredients, such as caffeine, quinine (or as a quinine salt, such as quinine sulfate), bitter flavor ingredients such as bitter orange peel oil, Bitrex Bitter compound, and other botanical extract ingredients, such as pepper extract (Cubeb), and the like. Flavor enhancing ingredients may also be useful neotame taste modifying ingredients according to this invention. Useful flavor enhancing ingredients include Cubeb, Robertet mouthfeel enhancer, Jambu, Virginia Dare Prosweet, Ohly Krit flavor enhancer, and David Michael's coffee beverage flavor enhancer. Virginia Dare Prosweet, vanilla and vanillin are particularly useful neotame taste modifying ingredients. Other food additive ingredients, such as emulsifiers, surfactants and the like have also been shown to positively affect taste characteristics imparted by neotame. Tween 60® (polysorbate 60), Tween 80® (polysorbate 80) and lecithin, were shown to be effective taste modifying ingredients according to this invention when used as a taste modifying ingredient for a tabletop sweetener in a whitened coffee beverage. According to this invention, a taste modifying flavoring ingredient or a food additive ingredient may be incorporated into a neotame-containing composition in an amount that is sufficient to positively affect at least one of the taste characteristics imparted by neotame, but that is also less than the taste threshold amount of the flavoring ingredient in that composition. As previously noted, the effectiveness of the neotame taste modifying ingredient will depend on the compositions in which it is used. For example, in a test cola-beverage formulation, David Michael's bitter flavor and Natural flavor enhancer were found to be ineffective taste modifying ingredients according to this invention. Robertet mouthfeel enhancer was found to be an effective taste modifying ingredient for use in the test cola-flavored beverage, but was found to be ineffective as a taste modifying ingredient for a tabletop sweetener in a whitened coffee beverage. Robertet sweetness enhancer and Robertet masking compound were also found to be ineffective as taste modifying ingredients for a tabletop sweetener in a whitened coffee beverage. Mesifuran was not an effective taste modifying ingredient when evaluated in a test cola-flavored beverage. These ingredients, however, may be useful taste modifying ingredients in different product uses, e.g., different formulations or different applications that may contain different flavoring ingredients.

Another embodiment of this invention contemplates the use of modified forms of neotame to provide compositions possessing an improved taste compared to compositions containing neotame. Specifically, the improved taste results from the positive effect on at least one taste characteristic imparted by neotame by the modification of neotame. The modified form of neotame may be used as either a sweetening ingredient (present at sweetening effective concentrations) or used as a neotame taste modifying ingredient (at below taste threshold concentrations). Accordingly, either neotame or the modified form of neotame may be present at sweetening effective concentrations. The modified forms of neotame useful in this invention include the salts, complexes, or co-crystallized mixtures of neotame described hereinabove.

According to this invention, a modified form of neotame, at a sweetening effective concentration, may be used to sweeten a composition and impart to the composition an improved taste compared to the composition sweetened with neotame, wherein one or more of the taste characteristics imparted by neotame are positively affected. Alternatively, neotame or a modified form of neotame may be combined with a modified form or different modified form of neotame, respectively, to positively affect one or more of the taste characteristics imparted by neotame. In this embodiment, the neotame or modified forms of neotame may be present in a composition at sweetening effective concentrations or below taste threshold concentrations such the total concentration provides a desired sweetness intensity and at least one of the taste characteristics imparted by neotame in the composition is positively affected. Exemplary modified forms of neotame that possess at least one taste characteristic that has been positively modified over neotame include acesulfame-neotame, saccharin-neotame, potassium-neotame salt, calcium-neotame salt, neotame-phosphate salt and neotame-beta-cyclodextrin complex. Advantageously, the modified form of neotame may also be used in combination with one or more of the other herein-described neotame taste modifying ingredients. According to this invention, the modified form of neotame will provide a taste wherein one or more of the taste characteristics imparted by neotame in at least one product use is positively affected. Neotame-monopotassium phosphate and neotame-monocalcium phosphate, were found to be ineffective taste modifying ingredients according to this invention when evaluated in test cola-beverage formulation. These ingredients, however, may be useful taste modifying ingredients in different product uses, e.g., different formulations or different applications that may contain different flavoring ingredients.

According to this invention, modification of at least one of the taste characteristics imparted by neotame may be accomplished by incorporating one or more of any of the above-described neotame taste modifying ingredients, in any combination, into a neotame-containing composition or by incorporating a modified form of neotame in a composition that may also contain neotame or one or more of any of the above-described neotame taste modifying ingredients. In addition, this invention contemplates modification of at least one of the taste characteristics imparted by neotame by use of one or more of any of the above-described neotame taste modifying ingredients in combination with one or more hydrophobic acid additives. The hydrophobic acid additives useful herein are described in U.S. Provisional patent application No. 60/134,058, filed May 13, 1999, entitled "Modification of the Taste and Physicochemical Properties of N-[N-(3,3-Dimethylbutyl)-L-α-aspartyl]-L-phenylalanine 1-methyl ester Using Hydrophobic Acid Additives," which is incorporated by reference herein.

Accordingly, a neotame taste modifying ingredient may be a combination of a carbohydrate ingredient with a salt ingredient, a combination of a carbohydrate ingredient with an amino acid or nucleotide ingredient, a combination of two or more carbohydrate ingredients or two or more amino acid or nucleotide ingredients, or may be a combination of a modified form of neotame with a carbohydrate ingredient.

Particularly preferred compositions of this invention include liquid compositions, especially beverages, and solid compositions, especially, table-top sweetener compositions and powdered soft drink mixes. These solid compositions, such as a table-top sweetener comprising neotame, may also include any other ingredients commonly present in table-top sweeteners in order to tailor the taste of the product to a specific end use, e.g., for sweetening coffee, tea or fruit. A table-top sweetener comprising neotame may take any known form. Suitable forms include, but are not limited to, sachets or packets containing the sweetener in powder or granular form, tablets, liquid sweeteners, and jar, pouches, pocket or other forms in which the sweetener may be measured in, for example, spoon for spoon form.

A preferred embodiment of this invention comprises a neotame-sweetened beverage containing a taste modifying ingredient in an amount sufficient to positively affect at least one taste characteristic imparted by neotame, wherein that amount is less than the ingredient's taste threshold concentration. Most preferably, the taste modifying ingredient is at least one of a salt ingredient, an amino acid or nucleotide ingredient, a carbohydrate ingredient, a high intensity sweetening ingredient, a flavoring ingredient, a flavor enhancing ingredient, or an emulsifying agent.

The compositions described herein may be prepared according to conventional techniques, and may be prepared using any convenient method for incorporating neotame and the taste modifying ingredient(s) into the compositions or ingredients used therein, in the proportions stated and in a manner suitable to provide the desired consistency, homogeneity of dispersion, etc. of the composition. Neotame, together with the taste modifying ingredient(s) may be blended with the composition or blended with an ingredient used in the preparation of the composition. For example, neotame and the taste modifying ingredient may be blended or mixed into powdered drink mixes, liquid beverages, yogurts and other dairy products, puddings, frostings, dressings, sauces, syrups, gravies, and the like, or may be mixed with other dry or wet ingredients that are used in the preparation of these compositions. Alternatively, neotame may be dissolved in a suitable solvent, such as water or water/alcohol mixtures and then added to the composition or combined with an ingredient used in the preparation of the composition. The taste modifying ingredient(s) may be added at any time to the composition, either prior to, subsequent to or simultaneously with the addition of neotame. A neotame/taste modifying ingredient(s) mixture, prepared by simply admixing the ingredient(s) with neotame or by admixing the ingredients) and neotame in a suitable solvent (e.g., water), may be used to sweeten food compositions by dispersing the mixture onto a food composition, by blending the mixture into the composition, by blending the mixture into an ingredient used in the preparation of the composition, or by dipping or dredging the composition in the mixture.

There are several additional conventional ingredients that may be included with the neotame and taste modifying ingredient(s) in the compositions of this invention. Apart from the requirement that such co-ingredients are ingestibly acceptable and thus non-toxic or otherwise non-deleterious, conventional materials may be used and broadly include other flavoring ingredients, delivery forms (vehicles), stabilizers, thickeners, surface active agents, conditioners and flavor intensifiers. For example, bulking agents useful for the preparation of tabletop formulations include, but are not limited to, dextrose, maltodextrin, lactose, inulin, polyols, polydextrose, cellulose and cellulose derivatives and organic acids including, but not limited to, citric acid and malic acid. Flavoring additives, used at taste threshold concentrations, adjuvants and the like may also be conventionally included in these compositions. Such co-ingredients, or adjuvants are well known in the art for such use and have been extensively described in the literature.

The Examples which follow are intended as an illustration of certain preferred embodiments of the invention, and no limitation of the invention is implied.

In all of the examples that follow, at least one taste characteristic in the beverage or food product prepared using neotame and one or more taste modifying ingredients, or using a modified form of neotame, has been positively affected compared to the taste of the beverage or food product prepared using neotame, without added taste modifying ingredient(s).

The following examples 1–50 and 79 are directed to evaluations of taste modifying ingredients in either a cola-flavored beverage or a reconstituted powdered soft drink beverage containing about 15 ppm to about 25 ppm neotame (sweetening concentration). When a neotame salt was used as a taste modifying/sweetening ingredient, the neotame salt as added in an amount sufficient to provide about 15 ppm to about 25 ppm neotame (e.g., about 0.0028 g of a potassium neotame salt would be used to provide 100 ml of a 25 ppm neotame solution). The taste modifying ingredient was dissolved in the sweetened beverage and the beverage was allowed to stand overnight at room temperature prior to evaluation. Evaluations of the cola-flavored beverages were conducted using a beverage containing water, sodium benzoate (0.16%), phosphoric acid (0.22%), citric acid (0.05%), trisodium citrate (0.08%), caffeine (0.03%), Flavor 28 (1.72%), sweetened with neotame in an amount of about 0.0015% to about 0.0025% (15 ppm to 25 ppm), adjusted to pH 3.2 using sodium citrate.

EXAMPLE 1

Addition of acesulfame-K at a concentration of 20 to 40 parts per million (ppm) to a neotame-sweetened cola-flavored beverage positively affected at least one taste characteristic imparted by neotame.

EXAMPLE 2

Addition of Bitrex® Bitter Compound at 17 to 22 parts per trillion (ppt) to a neotame-sweetened cola-flavored beverage positively affected at least one taste characteristic imparted by neotame.

EXAMPLE 3

Addition of threonine at a concentration of 5 ppm to 30 ppm to a neotame-sweetened cola-flavored beverage positively affected at least one taste characteristic imparted by neotame.

EXAMPLE 4

Addition of a potassium-neotame salt, glycerol (400 ppm) and sugar (sucrose, 4000 ppm) to a cola-flavored beverage, provided a neotame salt-sweetened cola-flavored beverage having an improved taste, wherein at least one taste characteristic imparted by neotame was positively affected, compared to the taste of a neotame-sweetened cola-flavored beverage.

EXAMPLE 5

Addition of a calcium-neotame salt, glycerol (400 ppm) and sugar (sucrose, 4000 ppm) to a cola-flavored beverage, provided a neotame salt-sweetened cola-flavored beverage having an improved taste, wherein at least one taste characteristic imparted by neotame was positively affected, compared to the taste of a neotame-sweetened cola-flavored beverage.

EXAMPLE 6

Addition of an acesulfame-neotame salt and glycerol (400 ppm) to a cola-flavored beverage, provided a neotame salt-sweetened cola-flavored beverage having an improved taste, wherein at least one taste characteristic imparted by neotame was positively affected, compared to the taste of a neotame-sweetened cola-flavored beverage.

EXAMPLE 7

Addition of quinine sulfate at a concentration of 0.01 to 1 ppm to a neotame-sweetened cola-flavored beverage positively affected at least one taste characteristic imparted by neotame.

EXAMPLE 8

Addition of L-tyrosine at a concentration of 15 to 50 ppm to a neotame-sweetened cola-flavored beverage positively affected at least one taste characteristic imparted by neotame.

EXAMPLE 9

Addition of L-tyrosine (50 ppm) and acesulfame-K (40 ppm) to a neotame-sweetened cola-flavored beverage positively affected at least one taste characteristic imparted by neotame.

EXAMPLE 10

Addition of L-tyrosine (50 ppm) and glycerol (40 ppm) to a neotame-sweetened cola-flavored beverage positively affected at least one taste characteristic imparted by neotame.

EXAMPLE 11

Addition of an acesulfame-neotame salt at a concentration of 40 ppm to a cola-flavored beverage, provided a neotame salt-sweetened cola-flavored beverage having an improved taste, wherein at least one taste characteristic imparted by neotame was positively affected, compared to the taste of a neotame-sweetened cola-flavored beverage.

EXAMPLE 12

Addition of a potassium-neotame salt to a cola-flavored beverage provided a neotame salt-sweetened cola-flavored beverage having an improved taste, wherein at least one taste characteristic imparted by neotame was positively affected, compared to the taste of a neotame-sweetened cola-flavored beverage.

EXAMPLE 13

Addition of neohesperidin dihydrochalcone (NHDC) at a concentration of 3 ppm to a neotame-sweetened cola-flavored beverage positively affected at least one taste characteristic imparted by neotame.

EXAMPLE 14

Addition of monoammonium glycyrrhizinate at a concentration of 0.25 ppm to a neotame-sweetened cola-flavored beverage positively affected at least one taste characteristic imparted by neotame.

EXAMPLE 15

Addition of bitter orange peel oil at a concentration of 1 ppm to a neotame-sweetened cola-flavored beverage positively affected at least one taste characteristic imparted by neotame.

EXAMPLE 16

Addition of Cubeb (obtained from Universal Flavors, Indianapolis, Indiana) at a concentration of 0.1 ppm to 0.2 ppm to a neotame-sweetened cola-flavored beverage positively affected at least one taste characteristic imparted by neotame.

EXAMPLE 17

Addition of ginger extract (obtained from Virginia Dare) at a concentration 0.27 ppm to a neotame-sweetened cola-flavored beverage positively affected at least one taste characteristic imparted by neotame.

EXAMPLE 18

Addition of saccharin at a concentration of 20 to 150 ppm to a neotame-sweetened cola-flavored beverage positively affected at least one taste characteristic imparted by neotame. Addition of saccharin at a concentration 100 ppm to the cola-flavored beverage used for these studies provided the best tasting beverage.

EXAMPLE 19

Addition of a calcium-neotame salt to a cola-flavored beverage provided a neotame salt-sweetened cola-flavored beverage having an improved taste, wherein at least one taste characteristic imparted by neotame was positively affected, compared to the taste of a neotame-sweetened cola-flavored beverage.

EXAMPLE 20

Addition of mannitol at a concentration of 100 ppm to 2,000 ppm to a neotame-sweetened cola-flavored beverage positively affected at least one taste characteristic imparted by neotame.

EXAMPLE 21

Addition of glycerol at a concentration of 15 ppm to 2,000 ppm to a neotame-sweetened cola-flavored beverage positively affected at least one taste characteristic imparted by neotame.

EXAMPLE 22

Addition of sodium chloride at a concentration of 5 to 50 ppm to a neotame-sweetened cola-flavored beverage positively affected at least one taste characteristic imparted by neotame. Addition of sodium chloride at a concentration 10 ppm to the cola-flavored beverage used for these studies provided the best tasting beverage.

EXAMPLE 23

Addition of sucrose at a concentration of 2000 ppm to 4000 ppm to a neotame-sweetened cola-flavored beverage positively affected at least one taste characteristic imparted by neotame.

EXAMPLE 24

Addition of a neotame-phosphate salt to a cola-flavored beverage, provided a neotame salt-sweetened cola-flavored beverage having an improved taste, wherein at least one taste characteristic imparted by neotame was positively affected, compared to the taste of a neotame-sweetened cola-flavored beverage.

EXAMPLE 25

Addition of IFF Sugar Distillate (International Flavors and Fragrances, New York, N.Y.) at a concentration of 5 ppm to a neotame-sweetened cola-flavored beverage positively affected at least one taste characteristic imparted by neotame.

EXAMPLE 26

Addition of Robertet mouthfeel enhancer (available from Robertet, South Plainfield, N.J.) at a concentration of 100–500 ppm to a neotame-sweetened cola-flavored beverage positively affected at least one taste characteristic imparted by neotame.

EXAMPLE 27

Addition of caffeine at a concentration of 140 to 425 ppm to a neotame-sweetened cola-flavored beverage positively affected at least one taste characteristic imparted by neotame.

EXAMPLE 28

Addition of erythritol at a concentration of 200 ppm to 10,000 ppm to a neotame-sweetened cola-flavored beverage positively affected at least one taste characteristic imparted by neotame.

EXAMPLE 29

Addition of polysorbate 60 (Tween® 60) at a concentration of 10 to 15 ppm to a neotame-sweetened cola-flavored beverage positively affected at least one taste characteristic imparted by neotame.

EXAMPLE 30

Addition of polysorbate 65 (Tween 65®) at a concentration of 10 to 15 ppm to a neotame-sweetened cola-flavored beverage positively affected at least one taste characteristic imparted by neotame.

EXAMPLE 31

Addition of polysorbate 80 (Tween 80®) at a concentration of 10 to 15 ppm to a neotame-sweetened cola-flavored beverage positively affected at least one taste characteristic imparted by neotame.

EXAMPLE 32

Addition of aspartame at a concentration of 20 to 40 ppm to a neotame-sweetened cola-flavored beverage positively affected at least one taste characteristic imparted by neotame.

EXAMPLE 33

Addition of Ohly Krit Flavor Enhancer at a concentration of 1 to 10 ppm to a neotame-sweetened cola-flavored beverage positively affected at least one taste characteristic imparted by neotame.

EXAMPLE 34

Addition of Jambu (available from Robertet, South Plainfield, N.J.) at a concentration of 10 to 25 ppm to a neotame-sweetened cola-flavored beverage positively affected at least one taste characteristic imparted by neotame.

EXAMPLE 35

Addition of polysorbate 80 (Tween 80®, 10 ppm) with Jambu (10 ppm) to a neotame-sweetened cola-flavored beverage positively affected at least one taste characteristic imparted by neotame.

EXAMPLE 36

Addition of vanillin at a concentration of 0.5 ppm to neotame-sweetened flavored drinks (reconstituted punch and lemonade-flavored soft drinks) positively affected at least one taste characteristic imparted by neotame.

EXAMPLE 37

Addition of neohesperidin dihydrochalcone at a concentration of 2 to 3 ppm in a neotame-sweetened hot cocoa beverage positively affected at least one taste characteristic imparted by neotame.

EXAMPLE 38

Addition of neohesperidin dihydrochalcone at a concentration of 2 to 3 ppm to a neotame-sweetened reconstituted punch or lemonade flavored powdered soft drinks positively affected at least one taste characteristic imparted by neotame.

EXAMPLE 39

Addition of glycerin at a concentration of 4 to 35 ppm to a neotame-sweetened reconstituted punch-flavored powdered soft drink positively affected at least one taste characteristic imparted by neotame.

EXAMPLE 40

Addition of glycerin at a concentration of 8.4 ppm to a neotame-sweetened gelatin dessert positively affected at least one taste characteristic imparted by neotame.

EXAMPLE 41

Addition of tyrosine at a concentration of 35 ppm to a neotame-sweetened reconstituted punch-flavored powdered soft drink positively affected at least one taste characteristic imparted by neotame.

EXAMPLE 42

Addition of serine at a concentration of 5 ppm to 30 ppm to a neotame-sweetened reconstituted strawberry-flavored powdered soft drink positively affected at least one taste characteristic imparted by neotame.

EXAMPLE 43

Addition of acesulfame-K at a concentration of 40 to 100 ppm to a neotame-sweetened reconstituted punch or lemonade-flavored powdered soft drink positively affected at least one taste characteristic imparted by neotame.

EXAMPLE 44

Addition of acesulfame-K at a concentration of 40 to 100 ppm to a neotame-sweetened hot cocoa beverage positively affected at least one taste characteristic imparted by neotame.

EXAMPLE 45

Addition of aspartame at a concentration of 100 ppm to a neotame-sweetened hot cocoa beverage positively affected at least one taste characteristic imparted by neotame.

EXAMPLE 46

Addition of aspartame at a concentration of 100 to 160 ppm to a neotame-sweetened reconstituted punch or lemonade-flavored powdered soft drink positively affected at least one taste characteristic imparted by neotame.

EXAMPLE 47

Addition of saccharin at a concentration of 20 to 40 ppm to a neotame-sweetened reconstituted punch or lemonade-flavored powdered soft drink positively affected at least one taste characteristic imparted by neotame.

EXAMPLE 48

Addition of saccharin at a concentration of 20 to 40 ppm to a neotame-sweetened hot cocoa beverage positively affected at least one taste characteristic imparted by neotame.

EXAMPLE 49

Addition of cyclamate at a concentration of 250 ppm to a neotame-sweetened reconstituted punch or lemonade-flavored powdered soft drink affected at least one taste characteristic imparted by neotame.

EXAMPLE 50

Addition of cyclamate at a concentration of 130 to 250 ppm to a neotame-sweetened hot cocoa beverage positively affected at least one taste characteristic imparted by neotame.

The following examples 51–78 are directed to solid tabletop sweetener preparations, specifically sachet or packet preparations, comprising mixtures of neotame, one or more taste modifying ingredients and a bulking agent. Taste evaluations were conducted on sweetened coffee or tea beverages prepared by dissolving the solid tabletop sweetener (total weight of 1.00 g) in a cup of brewed coffee or tea. The concentration of the ingredients in the tabletop sweetener is expressed as a percentage by weight, whereas the concentration of the ingredients in the beverage is expressed as parts per million (ppm) or parts per trillion (ppt). The beverages were prepared such that the concentration of neotame in sweetened, whitened coffee beverage was approximately 3–5 ppm and the concentration of neotame in sweetened tea was approximately 5–7 ppm.

EXAMPLE 51

At least one taste characteristic imparted by neotame was positively affected in a whitened, brewed coffee beverage that was sweetened with a solid tabletop sweetener containing aspartame (0.6% to 1.25% by weight, beverage concentration 25 to 52 ppm), neotame (0.09% by weight, beverage concentration 3.75 ppm) and Unidex® bulking agent (a mixture of maltodextrin and dextrin, available from Corn Products Company, Summit-Argo, Ill.).

EXAMPLE 52

At least one taste characteristic imparted by neotame was positively affected in a whitened, brewed coffee beverage that was sweetened with a solid tabletop sweetener containing saccharin (1.32% by weight, beverage concentration 5.5 ppm), neotame (0.09% by weight, beverage concentration 3.75 ppm) and Unidex® bulking agent.

EXAMPLE 53

At least one taste characteristic imparted by neotame was positively affected in a whitened, brewed coffee beverage that was sweetened with a solid tabletop sweetener containing a dry blend of a saccharin/neotame mixture (containing 55.02 ppm saccharin and 0.744 ppm neotame) and Unidex® bulking agent.

EXAMPLE 54

At least one taste characteristic imparted by neotame was positively affected in a whitened, brewed coffee beverage that was sweetened with a solid tabletop sweetener containing maltol (Veltol®, available from Cultor Food Science, Ardsley, N.Y., 0.035% by weight, beverage concentration 1.44 ppm), neotame (0.09% by weight, beverage concentration 3.75 ppm) and Unidex® bulking agent.

EXAMPLE 55

At least one taste characteristic imparted by neotame was positively affected in a whitened, brewed coffee beverage that was sweetened with a solid tabletop sweetener containing thaumatin (0.12% by weight, beverage concentration 5.0 ppm), neotame (0.09% by weight, beverage concentration 3.75 ppm) and Unidex® bulking agent.

EXAMPLE 56

At least one taste characteristic imparted by neotame was positively affected in a whitened, brewed coffee beverage that was sweetened with a solid tabletop sweetener containing neohesperidin dihydrochalcone (0.040% to 0.048% by weight, beverage concentration 1.68 to 2.0 ppm), neotame (0.09% by weight, beverage concentration 3.75 ppm) and Unidex® bulking agent.

EXAMPLE 57

At least one taste characteristic imparted by neotame was positively affected in a whitened, brewed coffee beverage that was sweetened with a solid tabletop sweetener containing glycerol (0.04% to 0.2% by weight, beverage concentration 1.7 to 8.3 ppm), neotame (0.079% by weight, beverage concentration 3.3 ppm) and Unidex® bulking agent.

EXAMPLE 58

Compared to the taste of a neotame-sweetened coffee beverage, at least one taste characteristic imparted by neotame was positively affected in a whitened, brewed coffee beverage that was sweetened with a solid tabletop sweetener containing a sodium-neotame salt (0.09% by weight, beverage concentration 3.75 ppm) and Unidex® bulking agent.

EXAMPLE 59

Compared to the taste of a neotame-sweetened coffee beverage, at least one taste characteristic imparted by neotame was positively affected in a whitened, brewed coffee beverage that was sweetened with a solid tabletop sweetener containing a calcium-neotame salt (0.056% by weight, beverage concentration 2.33 ppm) and Unidex® bulking agent.

EXAMPLE 60

Compared to the taste of a neotame-sweetened coffee beverage, at least one taste characteristic imparted by neotame was positively affected in a whitened, brewed coffee beverage that was sweetened with a solid tabletop sweetener containing a potassium-neotame salt (0.11% by weight, beverage concentration 4.58 ppm) and Unidex® bulking agent.

EXAMPLE 61

Compared to the taste of a neotame-sweetened coffee beverage, at least one taste characteristic imparted by neotame was positively affected in a whitened, brewed coffee beverage that was sweetened with a solid tabletop sweetener containing glycerol (0.03% by weight, beverage concentration 1.25 ppm) and a potassium-neotame salt (0.0565% by weight, beverage concentration 2.35 ppm) and Unidex® bulking agent.

EXAMPLE 62

At least one taste characteristic imparted by neotame was positively affected in a whitened, brewed coffee beverage that was sweetened with a solid tabletop sweetener containing ethyl maltol (0.0482% by weight, beverage concentration 2 ppm), neotame (0.09% by weight, beverage concentration 3.75 ppm) and Unidex® bulking agent.

EXAMPLE 63

At least one taste characteristic imparted by neotame was positively affected in a whitened, brewed coffee beverage that was sweetened with a solid tabletop sweetener containing Virginia Dare Prosweet MM50 (available from Virginia Dare Company, Brooklyn, N.Y., 0.072% to 0.240% by weight, beverage concentration 3 to 10 ppm), neotame (0.09% by weight, beverage concentration 3.75 ppm) and Unidex® bulking agent.

EXAMPLE 64

At least one taste characteristic imparted by neotame was positively affected in a whitened, brewed coffee beverage that was sweetened with a solid tabletop sweetener containing calcium chloride (0.072% by weight, beverage concentration 3 ppm), neotame (0.09% by weight, beverage concentration 3.75 ppm) and Unidex® bulking agent.

EXAMPLE 65

At least one taste characteristic imparted by neotame was positively affected in a whitened, brewed coffee beverage that was sweetened with a solid tabletop sweetener containing polysorbate 60 (0.05% to 0.10% by weight, beverage concentration 2.08 to 4.2 ppm), neotame (0.09% by weight, beverage concentration 3.75 ppm) and Unidex® bulking agent.

EXAMPLE 66

At least one taste characteristic imparted by neotame was positively affected in a whitened, brewed coffee beverage that was sweetened with a solid tabletop sweetener containing a beta cyclodextrin-neotame complex (1.409% by weight, beverage concentration 58.7 ppm, providing a neotame concentration of 3.3 ppm) and Unidex® bulking agent.

EXAMPLE 67

At least one taste characteristic imparted by neotame was positively affected in a whitened, brewed coffee beverage that was sweetened with a solid tabletop sweetener containing Givaudan Roure Natural Coconut Flavor (available from Cincinnati, Ohio, 0.24% by weight, beverage concentration 10 ppm), neotame (0.09% by weight, beverage concentration 3.75 ppm) and Unidex® bulking agent.

EXAMPLE 68

At least one taste characteristic imparted by neotame was positively affected in a whitened, brewed coffee beverage that was sweetened with a solid tabletop sweetener containing Givaudan Roure Natural Coconut Flavor (0.12% by weight, beverage concentration 5.0 ppm), Givaudan Roure Natural Honey Flavor (0.12% by weight, beverage concentration 5.0 ppm), neotame (0.09% by weight, beverage concentration 3.75 ppm) and Unidex® bulking agent.

EXAMPLE 69

At least one taste characteristic imparted by neotame was positively affected in a whitened, brewed coffee beverage that was sweetened with a solid tabletop sweetener containing Virginia Dare Prosweet MM 50 (0.12% by weight, beverage concentration 5.0 ppm), Givaudan Roure Natural Honey Flavor (0.12% to 0.24% by weight, beverage concentration 5 ppm to 10.0 ppm), neotame (0.09% by weight, beverage concentration 3.75 ppm) and Unidex® bulking agent.

EXAMPLE 70

At least one taste characteristic imparted by neotame was positively affected in a whitened, brewed coffee beverage that was sweetened with a solid tabletop sweetener containing L-tyrosine (0.288% by weight, beverage concentration 12 ppm), neotame (0.09% by weight, beverage concentration 3.75 ppm) and Unidex® bulking agent.

EXAMPLE 71

At least one taste characteristic imparted by neotame was positively affected in a whitened, brewed coffee beverage that was sweetened with a solid tabletop sweetener containing L-tyrosine (0.24% by weight, beverage concentration 10 ppm), Virginia Dare Prosweet MM50 (0.12% by weight, beverage concentration 5.0 ppm), neotame (0.09% by weight, beverage concentration 3.75 ppm) and Unidex® bulking agent.

EXAMPLE 72

At least one taste characteristic imparted by neotame was positively affected in a whitened, brewed coffee beverage that was sweetened with a solid tabletop sweetener containing Givaudan Roure Coffee Flavor (0.24% to 1.20% by weight, beverage concentration 10 to 50 ppm), neotame (0.09% by weight, beverage concentration 3.75 ppm) and Unidex® bulking agent.

EXAMPLE 73

At least one taste characteristic imparted by neotame was positively affected in a whitened, brewed coffee beverage that was sweetened with a solid tabletop sweetener containing lecithin (EMULPUR® NP1, available from Lucas Meyer, Inc., Decatur, Ill., 0.168% by weight, beverage concentration 7 ppm), neotame (0.09% by weight, beverage concentration 3.75 ppm) and Unidex® bulking agent.

EXAMPLE 74

At least one taste characteristic imparted by neotame was positively affected in a whitened, brewed coffee beverage that was sweetened with a solid tabletop sweetener containing Bell Artificial Coffee Flavor (available from Bell Flavors and Fragrances, Inc., North Brook, Ill., 0.24% by weight, beverage concentration 10 ppm), neotame (0.09% by weight, beverage concentration 3.75 ppm) and Unidex® bulking agent.

EXAMPLE 75

At least one taste characteristic imparted by neotame was positively affected in a whitened, brewed coffee beverage that was sweetened with a solid tabletop sweetener containing BBA Molasses Flavor (available from Bush, Boake & Allen, Montvale, N.J.), 0.72% by weight, beverage concentration 30 ppm), neotame (0.09% by weight, beverage concentration 3.75 ppm) and Unidex® bulking agent.

EXAMPLE 76

At least one taste characteristic imparted by neotame was positively affected in a whitened, brewed coffee beverage that was sweetened with a solid tabletop sweetener containing Givaudan Roure Molasses Flavor (0.24% by weight, beverage concentration 10 ppm), neotame (0.09% by weight, beverage concentration 3.75 ppm) and Unidex® bulking agent.

EXAMPLE 77

At least one taste characteristic imparted by neotame was positively affected in a whitened, brewed coffee beverage that was sweetened with a solid tabletop sweetener containing David Michael Coffee Beverage Flavor Enhancer (available from Philadelphia, Pa., 0.24% by weight, beverage concentration 10 ppm), neotame (0.09% by weight, beverage concentration 3.75 ppm) and Unidex® bulking agent.

EXAMPLE 78

At least one taste characteristic imparted by neotame was positively affected in a whitened, brewed coffee beverage that was sweetened with a solid tabletop sweetener containing Givaudan Roure Coffee Flavor (0.24% by weight, beverage concentration 10 ppm), neotame (0.09% by weight, beverage concentration 3.75 ppm) and Unidex® bulking agent.

EXAMPLE 79

Addition of serine (50 ppm) to a neotame-sweetened cola-flavored beverage positively affected at least one taste characteristic imparted by neotame.

EXAMPLE 80

Addition of serine (25 ppm) to a neotame-sweetened strawberry-flavored yogurt positively affected at least one taste characteristic imparted by neotame.

While the invention has been described in terms of preferred embodiments and specific examples, other variations or modifications that those skilled in the art will recognize through routine experimentation are within the scope and teachings of this invention. This invention is not to be limited except as set forth in the following claims.

We claim:

1. A composition comprising a sweetening-effective amount of N-[N-(3,3-dimethylbutyl)-L-α-aspartyl]-L-phenylalanine 1-methyl ester of the formula

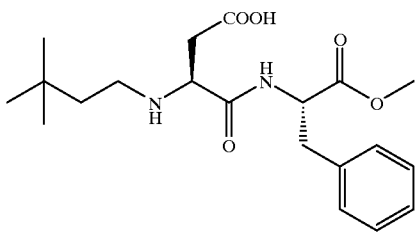

and at least one taste modifying ingredient, wherein said ingredient is present in an amount sufficient to positively affect at least one taste characteristic imparted by said N-[N-(3,3-dimethylbutyl)-L-α-aspartyl]-L-phenylalanine 1-methyl ester, and said ingredient is present in a concentration that is less than the ingredient's taste threshold concentration.

2. The composition according to claim 1, wherein said taste modifying ingredient comprises at least one salt ingredient.

3. The composition according to claim 2, wherein the salt ingredient is selected from sodium chloride, sodium sulphate, potassium phosphate, calcium phosphate, sodium tripolyphosphate, sodium bicarbonate, sodium carbonate, potassium carbonate, calcium carbonate, potassium hydrogen carbonate, calcium chloride-dihydrate and mixtures thereof.

4. The composition according to claim 1, wherein said taste modifying ingredient comprises at least one amino acid or nucleotide ingredient.

5. The composition according to claim 4, wherein said amino acid or nucleotide ingredient is an amino acid or a ribonucleic acid.

6. The composition according to claim 5, wherein said amino acid or nucleotide ingredient is selected from aspartic acid, tyrosine, serine, threonine, cysteine, glycine, alanine, asparagine, proline, sodium inosine-5' phosphate and sodium guanosine-5'phosphate.

7. The composition according to claim 1, wherein said taste modifying ingredient comprises serine.

8. The composition according to claim 1, wherein said taste modifying ingredient comprises at least one carbohydrate ingredient.

9. The composition according to claim 8, wherein said carbohydrate ingredient is at least one polyhydroxy compound.

10. The composition according to claim 9, wherein said polyhydroxy compound is selected from sugars, sugar distillates, sugar alcohols, pyrones, flavones, polyols and mixtures thereof.

11. The composition according to claim 10, wherein said polyhydroxy compound is selected from mannitol, sucrose, erythritol, maltitol, glycerol and mixtures thereof.

12. The composition according to claim 8, wherein said carbohydrate ingredient is glycerol.

13. The composition according to claim 1, wherein said taste modifying ingredient comprises at least one high intensity sweetening ingredient.

14. The composition according to claim 13, wherein said high intensity sweetening ingredient is selected from thaumatin, saccharine, acesulfame-K, aspartame, cyclamate and mixtures thereof.

15. The composition according to claim 1, wherein said taste modifying ingredient comprises at least one flavoring ingredient.

16. The composition according to claim 15, wherein said flavoring ingredient is selected from coffee flavoring ingredients, vanillin, honey flavoring ingredients, molasses flavoring ingredients, citrus flavoring ingredients, coconut flavoring ingredients, ginger, bitter flavor ingredients and mixtures thereof.

17. The composition according to claim 1, wherein said taste modifying ingredient comprises at least one bitter-tasting ingredient.

18. The composition according to claim 17, wherein said bitter-tasting ingredient is selected from caffeine, quinine, bitter orange oil and mixtures thereof.

19. The composition according to claim 1, wherein said taste modifying ingredient comprises at least one flavor enhancing ingredient.

20. The composition according to claim 19, wherein said flavor enhancing ingredient is selected from neohesperidin dihydrochalcone, glycyrrhizin salts, and mixtures thereof.

21. The composition according to claim 20, wherein said flavor enhancing ingredient is neohesperidin dihydrochalcone.

22. The composition according to claim 1, wherein said taste modifying ingredient comprises at least one emulsifying agent.

23. The composition according to claim 22, wherein said emulsifying agent is selected from polysorbate 60, polysorbate 80, lecithin and mixtures thereof.

24. The composition according to claim 1, wherein said taste modifying ingredient comprises a modified form of N-[N-(3,3-dimethylbutyl)-L-α-aspartyl]-L-phenylalanine 1-methyl ester.

25. The composition according to claim 24, wherein said modified form is a salt, complex, or co-crystallized mixture of N-[N-(3,3-dimethylbutyl)-L-α-aspartyl]-L-phenylalanine 1-methyl ester.

26. The composition according to claim 25, wherein said modified form of N-[N-(3,3-dimethylbutyl)-L-α-aspartyl]-L-phenylalanine 1-methyl ester is selected from acesulfame-neotame, saccharin-neotame, potassium-neotame salt, calcium-neotame salt, neotame-phosphate salt and neotame-beta-cyclodextrin complex.

27. A method for improving the taste of a composition sweetened with N-[N-(3,3-dimethylbutyl)-L-α-aspartyl]-L-phenylalanine 1-methyl ester comprising adding to said composition a taste modifying ingredient in an amount sufficient to positively affect at least one taste characteristic imparted by said N-[N-(3,3-dimethylbutyl)-L-α-aspartyl]-L-phenylalanine 1-methyl ester, wherein said amount is less than the taste threshold amount of said ingredient in said composition.

28. The method according to claim 27, wherein said taste modifying ingredient comprises at least one salt ingredient.

29. The method according to claim 27, wherein the salt ingredient is selected from sodium chloride, sodium sulphate, potassium phosphate, calcium phosphate, sodium tripolyphosphate, sodium bicarbonate, sodium carbonate, potassium carbonate, calcium carbonate, potassium hydrogen carbonate, calcium chloride-dihydrate and mixtures thereof.

30. The method according to claim 27, wherein said taste modifying ingredient comprises at least one amino acid or nucleotide ingredient.

31. The method according to claim 30, wherein said amino acid or nucleotide ingredient is an amino acid or a ribonucleic acid.

32. The method according to claim 31, wherein said amino acid or nucleotide ingredient is selected from aspartic acid, tyrosine, serine, threonine, cysteine, glycine, alanine, asparagine, proline, sodium inosine-5' phosphate and sodium guanosine-5' phosphate.

33. The method according to claim 27, wherein said taste modifying ingredient comprises serine.

34. The method according to claim 27, wherein said taste modifying ingredient comprises at least one carbohydrate ingredient.

35. The method according to claim 34, wherein said carbohydrate ingredient is at least one polyhydroxy compound.

36. The method according to claim 35, wherein said polyhydroxy compound is selected from sugars, sugar distillates, sugar alcohols, pyrones, flavones, polyols and mixtures thereof.

37. The method according to claim 36, wherein said polyhydroxy compound is selected from mannitol, sucrose, erythritol, maltitol, glycerol and mixtures thereof.

38. The method according to claim 37, wherein said carbohydrate ingredient is glycerol.

39. The method according to claim 27, wherein said taste modifying ingredient comprises at least one high intensity sweetening ingredient.

40. The method according to claim 39, wherein said high intensity sweetening ingredient is selected from thaumatin, saccharine, acesulfame-K, aspartame, cyclamate and mixtures thereof.

41. The method according to claim 27, wherein said taste modifying ingredient comprises at least one flavoring ingredient.

42. The method according to claim 41, wherein said flavoring ingredient is selected from coffee flavoring ingredients, vanillin, honey flavoring ingredients, molasses flavoring ingredients, citrus flavoring ingredients, coconut flavoring ingredients, ginger, bitter flavor ingredients and mixtures thereof.

43. The method according to claim 27, wherein said taste modifying ingredient comprises at least one bitter-tasting ingredient.

44. The method according to claim 43, wherein said bitter-tasting ingredient is selected from caffeine, quinine, bitter orange oil and mixtures thereof.

45. The method according to claim 27, wherein said taste modifying ingredient comprises at least one flavor enhancing ingredient.

46. The method according to claim 45, wherein said flavor enhancing ingredient is selected from neohesperidin dihydrochalcone, glycyrrhizin salts and mixtures thereof.

47. The method according to claim 46, wherein said flavor enhancing ingredient is neohesperidin dihydrochalcone.

48. The method according to claim 27, wherein said taste modifying ingredient comprises at least one emulsifying agent.

49. The method according to claim 48, wherein said emulsifying agent is selected from polysorbate 60, polysorbate 80, lecithin and mixtures thereof.

50. The method according to claim 27, wherein said taste modifying ingredient comprises a modified form of N-[N-(3,3-dimethylbutyl)-L-α-aspartyl]-L-phenylalanine 1-methyl ester.

51. The method according to claim 50, wherein said modified form is a salt, complex, or co-crystallized mixture of N-[N-(3,3-dimethylbutyl)-L-α-aspartyl]-L-phenylalanine 1-methyl ester.

52. The method according to claim 51, wherein said modified form of N-[N-(3,3-dimethylbutyl)-L-α-aspartyl]-L-phenylalanine 1-methyl ester is selected from acesulfame-neotame, saccharin-neotame, potassium-neotame salt, calcium-neotame salt, neotame-phosphate salt and neotame-beta-cyclodextrin complex.

53. A method for improving the taste of a composition comprising adding a modified form of N-[N-(3,3-dimethylbutyl)-L-α-aspartyl]-L-phenylalanine 1-methyl ester in an amount sufficient to sweeten said composition and positively affect at least one taste characteristic imparted by N-[N-(3,3-dimethylbutyl)-L-α-aspartyl]-L-phenylalanine 1-methyl ester in said composition, wherein said modified form comprises a salt, a co-crystallized complex or a cyclodextrin complex of said N-[N-(3,3-dimethylbutyl)-L-α-aspartyl]-L-phenylalanine 1-methyl ester.

54. The method according to claim 53, wherein said modified form of N-[N-(3,3-dimethylbutyl)-L-α-aspartyl]-L-phenylalanine 1-methyl ester is selected from acesulfame-neotame, saccharin-neotame, potassium-neotame salt, calcium-neotame salt, neotame-phosphate salt and neotame-beta-cyclodextrin complex.

55. The method according to claim 53, further comprising adding a taste modifying ingredient to said composition, wherein said taste modifying ingredient is present in a concentration that is less than the ingredient's taste threshold concentration and said taste modifying ingredient is at least one of a salt ingredient, an amino acid or nucleotide ingredient, a carbohydrate ingredient, a high intensity sweetening ingredient, a flavoring ingredient, a flavor enhancing ingredient, an emulsifying agent or a mixture thereof.

56. An improved sweetened beverage, wherein said beverage includes N-[N-(3,3-dimethylbutyl)-L-α-aspartyl]-L-phenylalanine 1-methyl ester in a sweetening effective amount, the improvement which comprises adding a taste modifying ingredient, wherein said taste modifying ingredient is added in an amount sufficient to positively affect at least one taste characteristic imparted by said N-[N-(3,3-dimethylbutyl)-L-α-aspartyl]-L-phenylalanine 1-methyl ester, and said ingredient is present in a concentration that is less than the ingredient's taste threshold concentration.

57. The beverage according to claim 56, wherein the taste modifying ingredient is at least one of a salt ingredient, an amino acid or nucleotide ingredient, a carbohydrate ingredient, a high intensity sweetening ingredient, a flavoring ingredient, a flavor enhancing ingredient, an emulsifying agent, a modified form of N-[N-(3,3-dimethylbutyl)-L-α-aspartyl]-L-phenylalanine 1-methyl ester, or a mixture thereof.

58. A composition comprising a sweetening-effective amount of N-[N-(3,3-dimethylbutyl)-L-α-aspartyl]-L-phenylalanine 1-methyl ester of the formula

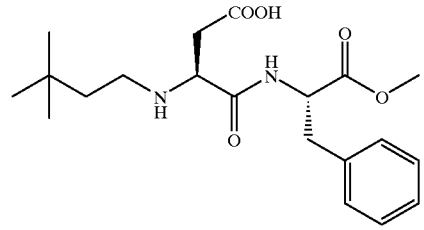

and a combination of taste modifying ingredients selected from the ingredients of claims 2, 4, 7, 8, 13, 15, 17, 19, 22 or 24, wherein said combination of ingredients is present in an amount sufficient to positively affect at least one taste characteristic imparted by said N-[N-(3,3-dimethylbutyl)-L-α-aspartyl]-L-phenylalanine 1-methyl ester, and said ingredients are present in concentrations that are less than the ingredients' taste threshold concentrations.

* * * * *